UNITED STATES PATENT OFFICE.

EUGEN LUDWIG, OF HOBOKEN, NEW JERSEY.

POLISHING-LIQUID.

SPECIFICATION forming part of Letters Patent No. 296,303, dated April 1, 1884,

Application filed June 9, 1883. (No specimens.)

*To all whom it may concern:*

Be it known that I, EUGEN LUDWIG, of Hoboken, in the county of Hudson and State of New Jersey, have invented certain new and useful Improvements in Polishing-Liquids, of which the following is a specification.

This invention has reference to an improved liquid for polishing furniture and other articles of wood; and it consists of Vienna lime, oil of turpentine, linseed-oil, and gasoline.

The liquid is prepared in the following manner: Fifteen parts of raw linseed-oil is dissolved in gasoline and allowed to stand for a day. Fifty parts of finely-screened Vienna lime is thoroughly mixed with twenty-five parts of oil of turpentine, to which the before-mentioned solution of linseed-oil and gasoline is added and thoroughly mixed therewith, and finally filled in bottles and corked for use.

Before use the contents of the bottle have to be thoroughly shaken and then a part of it placed on a soft linen rag, with which the objects to be polished, are rubbed, and finally polished off by a soft linen cloth of coarse texture.

I am aware of the patent granted to B. F. King, for paints, under date November 7, 1871, and No. 120,571, which contains the ingredients of my furniture-polish in connection with other ingredients, and I distinctly disclaim the same.

Having thus described my invention, I claim as new and desire to secure by Letters Patent—

A polishing-liquid composed of Vienna lime, oil of turpentine, linseed-oil, and gasoline, prepared substantially in the manner and for the purpose set forth.

In testimony that I claim the foregoing as my invention I have signed my name in presence of two subscribing witnesses.

EUGEN LUDWIG.

Witnesses:
  CARL KARP,
  SIDNEY MANN.